US006666806B2

(12) United States Patent
Kaprelian et al.

(10) Patent No.: US 6,666,806 B2
(45) Date of Patent: Dec. 23, 2003

(54) ELASTOMER-COVERED ROLLER HAVING A THERMALLY SPRAYED PERMEABLE BONDING MATERIAL

(75) Inventors: Paul J. Kaprelian, Franksville, WI (US); Gary S. Butters, Greenfield, WI (US); Bruce E. Hyllberg, Gurnee, IL (US)

(73) Assignee: American Roller Company, LLC, Union Grove, WI (US)

( * ) Notice: Subject to any disclaimer, the term of this patent is extended or adjusted under 35 U.S.C. 154(b) by 0 days.

(21) Appl. No.: 10/345,425

(22) Filed: Jan. 15, 2003

(65) Prior Publication Data

US 2003/0106217 A1 Jun. 12, 2003

Related U.S. Application Data

(60) Division of application No. 09/740,470, filed on Dec. 19, 2000, now Pat. No. 6,523,262, which is a continuation-in-part of application No. 09/570,250, filed on May 12, 2000, now Pat. No. 6,394,944.

(51) Int. Cl.[7] ................................................. B23P 15/00
(52) U.S. Cl. ............................. 492/56; 492/54; 492/58
(58) Field of Search ........................... 492/54, 56, 58, 492/34; 29/895.21, 895.3, 895.32; 427/447–449, 455, 409, 405, 421, 422, 453, 454; 101/216; 428/381, 379

(56) References Cited

U.S. PATENT DOCUMENTS

| | | | | | |
|---|---|---|---|---|---|
| 3,877,125 | A | * | 4/1975 | Finzer | 29/895.21 |
| 3,964,431 | A | * | 6/1976 | Namiki | 118/60 |
| 4,526,839 | A | * | 7/1985 | Herman et al. | 428/550 |
| 4,584,747 | A | * | 4/1986 | Katterbach et al. | 38/63 |
| 4,759,957 | A | * | 7/1988 | Eaton et al. | 427/226 |
| 5,023,985 | A | * | 6/1991 | Salo et al. | 492/53 |
| 5,235,747 | A | * | 8/1993 | Leino et al. | 29/895.32 |
| 5,283,121 | A | * | 2/1994 | Bordner | 428/381 |
| 5,334,288 | A | * | 8/1994 | Nasu et al. | 162/358.1 |
| 5,408,070 | A | * | 4/1995 | Hyllberg | 219/469 |
| 5,616,263 | A | * | 4/1997 | Hyllberg | 219/469 |
| 5,632,861 | A | * | 5/1997 | Crouse | 162/358.1 |
| 5,718,970 | A | * | 2/1998 | Longo | 428/325 |
| 5,759,142 | A | * | 6/1998 | Perdikaris | 492/54 |
| 5,869,808 | A | * | 2/1999 | Hyllberg | 219/216 |
| 6,069,346 | A | * | 5/2000 | Hyllberg | 219/469 |

* cited by examiner

*Primary Examiner*—I Cuda-Rosenbaum
(74) *Attorney, Agent, or Firm*—Quarles & Brady LLP

(57) ABSTRACT

A elastomer-covered roller (10) is provided with an improved bond coating for bonding the elastomeric cover (14b) to the core (11b). At least one layer of material (21) is thermally sprayed on the core (11b) to form a rough surface having a roughness from 400 microinches $R_a$ to 2000 microinches $R_a$ or greater. At least one layer (21, 25, 26, 31, 32) is either sufficiently permeable to divert bond-degrading fluids away from the bond line (22, 27, 33) or is impermeable to bond-degrading fluids.

20 Claims, 2 Drawing Sheets

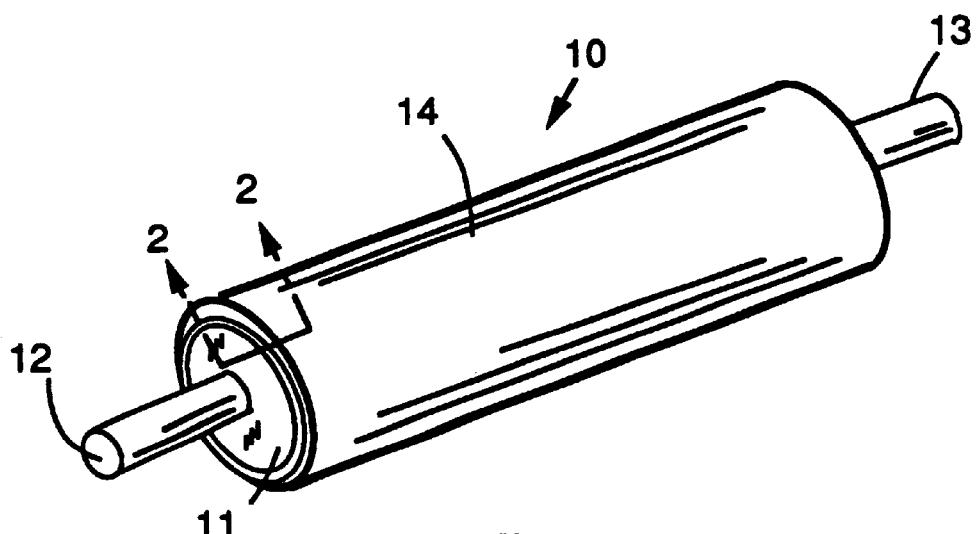
Fig. 1
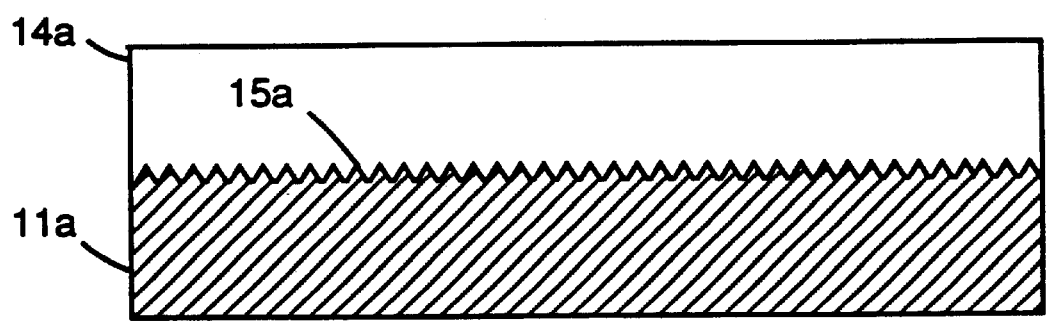
Fig. 2   PRIOR ART
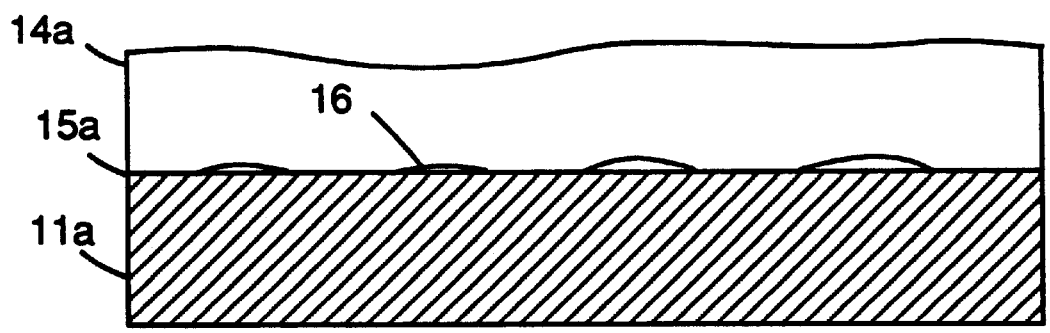
Fig. 3   PRIOR ART

ELASTOMER-COVERED ROLLER HAVING A THERMALLY SPRAYED PERMEABLE BONDING MATERIAL

CROSS-REFERENCE TO RELATED APPLICATION

This is a divisional of U.S. Pat. appl. Ser. No. 09/740,470, filed Dec. 19, 2000, now U.S. Pat. No. 6,523,262, which is a continuation-in-part of U.S. patent appl. Ser. No. 09/570,250 filed May 12, 2000, now U.S. Pat No. 6,394,944.

TECHNICAL FIELD

The invention relates to the manufacture of elastomer-covered rollers.

DESCRIPTION OF THE BACKGROUND ART

Rollers with covers of elastomeric material are used in a wide variety of industrial applications. One process is a plastic film manufacturing process known as cast film extrusion. Films of thermoplastic polymers such as polyvinylchloride and polycarbonate are made by this process. The most popular polymers made by this process are polyethylene and polypropylene.

In a typical application, molten polymer from an extruder is dropped into a nip formed between a chrome-plated steel roller and an elastomer-covered steel roller. One common type of elastomer used in this application is silicone rubber, although Hypalon™, available from Du Pont, and other polymer materials can also be used. The chrome-plated steel roller and the elastomer-covered roller are normally water cooled, or otherwise chilled, since the molten plastic may be at a temperature of several hundred degrees Fahrenheit. The chrome-plated roller quickly chills the plastic below its melting point and the nip formed with the elastomer-covered roller determines the gauge (thickness) and the surface finish of the film. The flexibility of the rubber covering compensates for minor machine misalignment and other variables, and provides a wider nip than two hard surfaced rollers.

In some applications, the film manufacturer also runs the surface of the silicone roller through a water bath to provide a measure of release (non-stick) from the tacky semi-molten plastic, and to provide additional cooling of the rubber surface. The excess water is removed with a doctor blade or other device and most of the remainder quickly evaporates from the hot roller surface. A small amount of the water (or water vapor) does pass through the extrusion nip. Because of the temperature difference between the rubber roller surface and the core/rubber bond line, water vapor tends to migrate through the rubber covering and condense at the core surface. Although the interface between the core and other materials is an area, this will be represented by the term "bond line" which is the portion seen in the drawings.

The vapor pressure of water at the hot roller surface may be several psi (pounds per square inch), while the vapor pressure at the core surface (typically 40 to 70° F.) is a fraction of one psi. This pressure difference drives the water vapor through the wall of the silicone rubber covering. Silicone rubber, in particular, is quite permeable to water vapor. Other polymers that may be used for the rubber covering, such as Hypalon, are either less permeable to water vapor or are more hydrophilic and absorb the water. These polymers are still susceptible to water vapor migration. The rate of migration is slower, however.

As used herein, the terms "permeable" and "impermeable" shall mean permeable and impermeable to moisture or to DOP-type plasticizers. "Moisture" shall mean water or water vapor, or both. Moisture and DOP-type plasticizers shall be included in the term "bond-degrading fluids", and the term "fluids" shall include liquids and vapors.

Even in applications where the rubber nip roller is not run through a water bath, migration of water vapor to the core is still known to be a problem, especially if the core temperature is below room temperature or the dew point. Rollers used for the application of coatings frequently have problems with water accumulation at the rubber/core bond line. As a result, rollers applying water-based coatings are known to have corrosion and bond failure at the core. The water vapor migration problem is not limited to cast extrusion nip rollers.

Silicone rubber is a material that may be used as the cover in the elastomer-covered roller described for the above application. Silicone rubber is, however, a material that is difficult to bond to a metal roller core on a consistent basis. It is also difficult to maintain the bond in applications where the roller is used at high temperature and high pressure. In some cases, the silicone rubber may peel cleanly off the metal core without leaving any residue of rubber, indicating a loss of bonding. Loss of bonding in one area requires that the elastomer-covered roller be replaced.

Under high pressure, typically 100 pli (pounds per linear inch) or more, there is a stress concentration at the rubber-to-metal bond line causing the silicone to tear away from the core due to shearing forces. The best currently available method to achieve a consistent bond is to grit blast the surface of the core to a high roughness, about 500 $R_a$, before applying the bonding agents or primers to the core. Bonding agents are applied in thin layers, typically less than 1 mil.

Grit blasting has certain limitations, however. It is difficult to achieve surface roughnesses greater than 500 $R_a$. Even maintaining 500 $R_a$ generally requires the constant use of new grit and attention to the grit blasting process variables. The grit-blasted core surface has a high $R_a$ but it is not a complex, high profile, surface like Velcro which not only has a high surface area, but also has a lot of "hooks". So called "hooks" improve the bond strength by trapping material within small surface features.

If a rougher surface were available, for example, in the 500 to 2000 $R_a$ range, not only would the surface area available for bonding be greatly increased, but the location of the rubber-to-metal bond line would be thicker and more diffused. This would in turn diffuse the shearing forces trying to tear the rubber from the core. Simply tooling a thread pattern into the core does not achieve this goal, because the direction of the thread is nearly parallel to the applied forces in the roller nip rather than perpendicular to them.

An improved bonding surface is needed for elastomers that are weakly or inconsistently bonded, especially if the covered rollers are exposed to high temperature or pressures, or high moisture conditions. The bonding surface must provide a high surface area and surface roughness and yet be easily and consistently produced. A very high surface roughness will also diffuse the stress at the bond line improving the longevity of the rubber to metal bond.

Polyurethane is another material that can be used for the elastomeric cover in the present invention. For bonding polyurethane to supporting layers, primary reliance has been placed on chemical bonding, to be assisted by mechanical bonding. As with silicone-based materials, the limit of surface roughness available with current methods of mechanical bonding is about 500 microinches $R_a$.

In addition, water vapor easily permeates through either a silicone rubber layer or a polyurethane layer, and corrosion may occur at the bond line due to the collection of water vapor there. Moisture will migrate into the outer roller cover if the roller is either chilled or exposed to water in the application. It would be beneficial to provide a bond coat or layer that is resistant to such corrosion, as well as one providing a stronger mechanical bond.

Another application of rollers is in the embossing and calendering of polyvinylchloride (PVC) film. The PVC film is made from a rigid PVC resin and is plasticized with oils to produce a softer material. PVC film is typically plasticized with DOP (dioctyl phthalate, a synthetic ester type oil) or chemically similar materials. These forming type operations require that the film be heated in a range of from 350° F. to 400° F. The film can lose DOP at these temperatures due to migration and evaporation.

In either embossing or calendering, the arrangement of rollers is similar to cast film extrusion with a hard surface roller forming a nip with a rubber-covered roller. Due to high temperatures, the rubber-covered roller is typically internally water cooled. The temperature differential through the rubber cover creates the same type of migration problem with DOP as is seen with water vapor in the cast film process. DOP migrates through the rubber covering to the core where it can degrade the bond between the core and the rubber cover. The hydraulic force of the oil tends to break the bond between the core and the cover layer of material. This is a second type of bond degradation, in addition to corrosion by moisture described above.

This can occur in rollers with silicone rubber covers, as well as rollers with a multi-layer configuration using EDPM rubber at the core. These materials may be permeated by DOP-type plasticizers.

Therefore, a general object of the invention is to improve bonding techniques and protect the bond layer against these adverse effects of its operating environment.

SUMMARY OF THE INVENTION

The invention concerns a method of making a roller that includes thermally spraying a bond coat to substantially cover a portion of the core on which an elastomeric layer is to be bonded and in which the bond coat provides a surface roughness to assure a strong mechanical bond. This bond coat has at least one coat that protects the bond line, either by allowing fluids to migrate away from the bond line, and/or by shielding the core from corrosion caused by the condensation of fluids near the surface of the core.

The invention also relates to a roller resulting from the utilizing this manufacturing method.

The bond coat comprises a thermally sprayed material selected from a group of materials consisting of metals, metal alloys, ceramics and cermets.

In the prior art, core surfaces were prepared by sanding or blasting the metal core prior to the application of chemical bonding agents. These methods do not always produce the desired level of mechanical bonding. Thermal spraying has been known in the manufacture of ceramic covered rollers, but has not heretofore been applied to bond elastomeric layers to a metal core.

The invention provides improved constructions of elastomer-covered rollers. These elastomers include silicone, EPDM (ethylene-propylene-diene-monomer), urethane elastomers and other synthetic or natural rubber elastomers. Although the invention is described in examples in which the elastomeric layer is the outer layer, it would also be possible to add layers outside the elastomeric layer.

The invention may be practiced in further aspects by providing a two-layer bond coat in which an outer layer is permeable to allow migration of water and water vapor, while the layer next to the core is impermeable to provide a corrosion barrier.

In another embodiment two layers of permeable material are applied to the core, with the inner layer being provided for better bonding to the core and the outer layer being provided for better bonding to the elastomeric layer.

Other objects and advantages of the invention, besides those discussed above, will be apparent to those of ordinary skill in the art from the description of the preferred embodiments which follow. In the description, reference is made to the accompanying drawings, which form a part hereof, and which illustrate examples of the invention. Such examples, however, are not exhaustive of the various embodiments of the invention, and therefore, reference is made to the claims which follow the description for determining the scope of the invention.

BRIEF DESCRIPTION OF THE DRAWINGS

FIG. 1 is a perspective view of a roller incorporating the present invention;

FIG. 2 is a detail sectional view of an embodiment of the prior art taken in a plane indicated by line 2—2 in FIG. 1;

FIG. 3 is a second sectional view of the embodiment of FIG. 2;

DETAILED DESCRIPTION OF THE PREFERRED EMBODIMENTS

Figure 4:
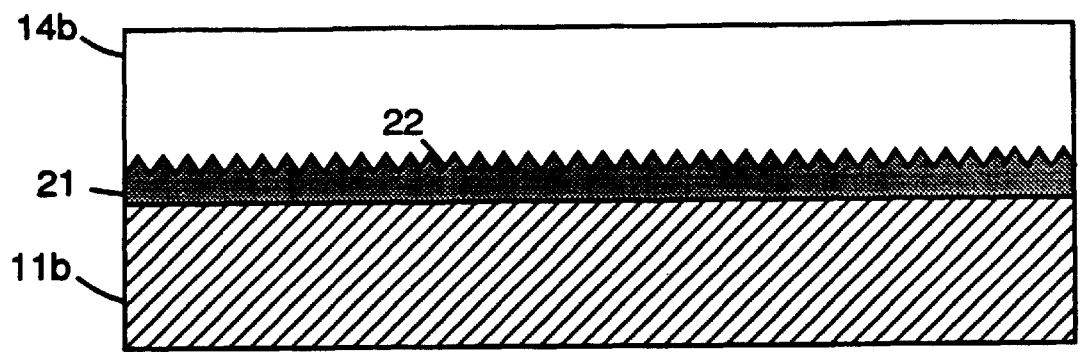
FIG. 4 is detail sectional view of a first embodiment of the invention taken in the same plane as FIG. 2.

Referring to FIG. 1, an elastomer covered roller 10 of the present invention includes a core 11, with journal shafts 12, 13 extending from opposite ends of the core 11, and a layer 14 of elastomeric material, in this example, silicone rubber, which in this example forms the outer cover of the roller 10. The core 11 may be made of metal, such as steel, or it may be made of a fiber-reinforced resinous composite material as disclosed in Carlson, U.S. Pat. No. 5,256,459, issued Oct. 26, 1993.

The elastomeric material may be applied using conventional and known methods. Silicone rubber can be applied using methods such as liquid casting, various forms of extrusion, or by wrapping the core with calendered sheets of rubber. Urethanes may be applied by liquid casting into a mold or by a liquid ribbon process described in U.S. Pat. No. 5,206,992 and U.S. Pat. No. 5,415,612 assigned to the assignee of the present invention.

The problem in the prior art is illustrated in FIGS. 2 and 3. There, a layer of silicone rubber 14a is bonded to the steel core 11a at a textured core surface 15a to which a bonding agent may be applied. The texture may be applied to the core surface 15a by grit blasting or by forming grooves in the surface 15a of the roller core. When subjected to temperature differential and moisture as described above, and after use, the outer layer 14a exhibits an uneven roller surface as seen in FIG. 3, and water 16 collects near the core 11a, at the bond line 15a seen in FIG. 3, where it causes corrosion or failure of the bonding of the outer layer 14a to the core 11a.

To correct this problem, a first embodiment of the invention, as illustrated in FIG. 4, includes a permeable bonding layer 21 of thermally sprayed material, which is applied to a steel core 11b as a bonding surface for the cover material 14b. This layer 21 is typically composed of a ceramic, cermet, metal, or alloy. The preferred materials are relatively high in porosity, while retaining structural integrity. These materials also provide rough, complex surfaces after spraying and are easily bonded to rubber at bond line 22. Unlike the simple surface profiles produced by sanding and blasting, thermally sprayed surfaces are more complex and have many surface features that can trap the rubber to form an interlocking bond. Layers produced by the wire arc process are somewhat more complex than sanded or blasted surfaces. Layers produced by the application of thermally sprayed powders are even more complex. Bonding surfaces produced by thermally sprayed powders are used for bonding ceramics to metals, a process which is entirely mechanical. When it is desired to bond an elastomer to a metal or alloy core, the bond is produced by a combination of chemical bonding and mechanical bonding. In that case, it is typical to apply bonding agents and primers over the thermally sprayed bond coat. This allows the elastomer to become chemically bonded to the thermally sprayed core.

The surface roughness for robust mechanical bonding of silicone rubber or similar materials is at least 400 microinches $R_a$ or more, although a surface roughness of only 200 microinches $R_a$ will provide a bond adequate for many applications ($R_a$ denotes average roughness under ASME standards and numerical measure in units of microinches.) With the thermally sprayed material, surfaces up to 2000 microinches $R_a$ have been successfully tested and provide a superior mechanical bond. Ceramics typically provide a surface roughness of less than 300 microinches $R_a$, if used alone, and do not provide bonding surfaces which are as robust as materials providing rougher surfaces. Alumina, alumina/titania, and zirconia ceramics can be used in combination with metals to increase the texture of bonding surface 22.

The preferred material for the embodiment in FIG. 4 is a metal or alloy, in wire or rod form, applied by a thermal spraying step. The resulting roughness of the bond line 22 is in a range from approximately 500 microinches $R_a$ to approximately 2000 microinches $R_a$. The maximum surface roughness of a thermally sprayed coating that can currently be produced is in the 2000 $R_a$ range. Please note, that for purposes of the explanation, the dimensions of the surface 22, as well as the thicknesses of the layers, have been exaggerated in FIGS. 4, 5 and 6 and are not represented to scale. The roughness of bond line surface 22 greatly improves the mechanical bond strength of the rubber-to-metal interface. One example is Sulzer Metco #2 wire, which is a Nr. 420-type (400 series) stainless steel alloy. 300 Series alloys can also be used. This material can be sprayed at high rates (>25 pounds per hour), is low in cost, and can be applied in a series of thinner coating layers or in a very thick layer. This material also bonds well to most elastomers. It provides the steel roller core 11b with a measure of protection against degrading fluids even though it is somewhat porous. Sulzer Metco #2 wire for example, applied by the wire arc thermal spray process, for example, can be applied in practical layers up to at least 250 mils in thickness. Thicker layers can be applied but may not be cost effective compared to other means to increase the core diameter.

One of the problems with conventional rubber roller re-covering is that part of the core surface is frequently machined off to provide a clean bonding surface. Over a period of time, the core diameter becomes too small to use or the rubber cover thickness increases excessively. With a layer of thermal spray material on the core, it is no longer necessary to remove part of the core surface to prepare the core surface for recovering. Part or all of the thermal spray layer can easily be machined off and replaced. Also, a few mils of the thermal spray layer can be ground off to clean the surface, followed by a thin application of the same thermal spray material. A new layer of thermal spray material is easily bonded to an old one. The materials bond well together, as long as the sprayed surface is clean and free from grease and oil. The addition of a thermally sprayed layer can be used to help control the outer diameter of the core.

Other thermally sprayed materials and methods have also proven to provide a superior bonding surface according to the present invention. Eutectic 18923 and Sulzer Metco 43C powders, which are both 80/20 alloys of nickel and chromium metals, can be used. These materials, as well as any corrosion resistant thermal spray material, 300 series and 400 series stainless steels, nickel chrome alloys, and other nickel-based alloys, provide both corrosion protection of the core and a suitable bonding surface for elastomers. The surface profiles of most thermally sprayed metals and alloys are very similar for a given particle size in the starting material. The roughness of the surface formed by a layer of Eutectic 18923 is typically 400 microinches $R_a$ while the Sulzer Metco 43C provides a surface roughness of about 700 microinches $R_a$, if sprayed with an oxygen-fuel gun device such as the Eutectic Teradyne 3000 or Sulzer Metco 6P. The particle size of the 43C is larger than the 18923 which accounts for the $R_a$ difference. A thickness of the coating or layer 21 of these materials in a range from 3 to 20 mils has provided strong and uniform bonds to an outer layer 14b of silicone rubber although thinner layers can be used as long as the thickness of the coating can be made uniform.

Although the Eutectic 18923 and 43C coatings do not provide as rough a bonding surface as the Sulzer Metco #2 wire arc coatings, these materials still provide a bond interface having properties superior to a grit-blasted surface having a similar $R_a$. Compared to grit blasting, the thermally sprayed surface is more easily and consistently formed as well.

Under magnification, the #2 wire arc surface appears to be a series of mountains and valleys. It is more complex than a sanded or blasted surface. The thermally sprayed powder surfaces produce a more complex surface that looks like a sintered metal under a microscope. The elastomer can actually diffuse into the thermal spray coating to the depth of a few mils.

The roughest surfaces, approximately 1000 microinches $R_a$ or greater, provide the best diffusion of stress concentrations at the bonding interface or boundary 22. The bond interface 22 becomes thicker and more diffused.

If the metal or alloy of the somewhat porous thermal spray layer 21 is dissimilar from the core material, it may be possible to have galvanic corrosion at the interface between the roller core 11b and the permeable layer 21. The two metals and the water (which will contain some electrolytes) will form a battery (in localized areas) and corrosion will occur at the anode, usually the (steel) core. Even though the core and thermally sprayed layer should be in solid electrical contact (i.e. a short circuit) and should not form a battery, the oxides present in the thermal spray coating can act as an insulator at the core interface depending on the material sprayed, the spray equipment, and the spray parameters.

Figure 5:
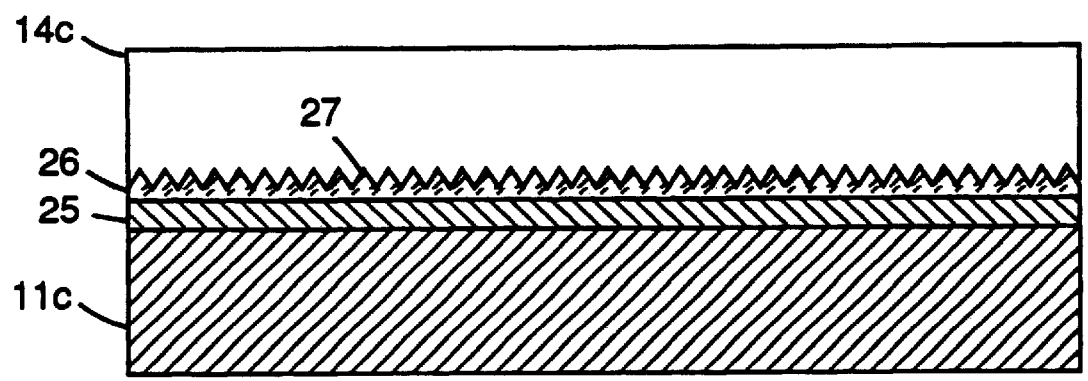
FIG. 5 is a detail sectional view of a second embodiment of the invention taken in the same plane as FIG. 2.

In order to avoid the possibility of corrosion, the thermal spray layer can be made in two layers of differing porosity levels as illustrated in FIG. 5. The first body of material 25 and the second body of material 26, should comprise the same metal or alloy material in order to avoid galvanic corrosion between the sprayed layers. The first body of material 25 can be applied by plasma spraying or HVOF (high velocity oxy-fuel) spraying or low velocity flame spraying to produce a relatively dense, pore-free, impermeable coating. It should be understood that the coating 25 can be the result of several passes of the spray gun which provides several thinner coatings that are merged into a thicker coating. The second body of material 26 can be then applied by the wire arc step to provide a coarse, porous coating, using the techniques described above. A suitable thickness for the first body of material 25 is in the range of 3 to 60 mils, but is more preferably in the range of 10 to 20 mils.

The second body of material 26 can then be applied in a second layer without any additional surface preparation. Excellent bonding between layers would be achieved due to the resulting roughness of bond line surface 27 of the thermally sprayed material 26.

In the case of thermally sprayed powder coatings used as the only bonding layer 26, a layer of Eutectic 18923 (or other nickel based corrosion resistant alloys or stainless steels), 3 mils or more in thickness, generally provides adequate corrosion protection of the core in lieu of the layer 25 of dense metal or alloy material.

Figure 6:
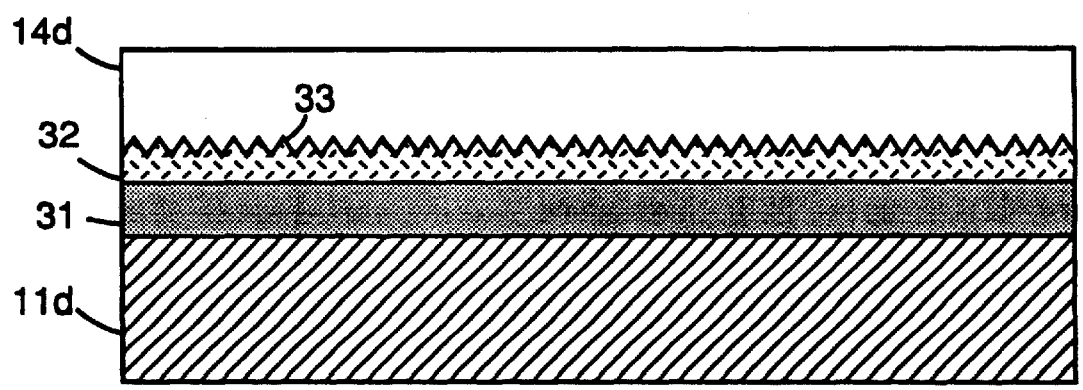
FIG. 6 is a detail sectional view of a third embodiment of the invention taken in the same plane as FIG. 2.

A third embodiment of the invention is illustrated in FIG. 6. There, both a wire arc layer 32 and a thermally sprayed powder 31 are rough, porous and permeable but have different structures. Wire arc coatings are very rough and provide excellent bonding to rubber and diffusion of stresses at the bond line 33. Thermally sprayed powder coatings are not as rough but have a more regular and predictable porosity network. In order to combine the best features of these coatings, a relatively thick layer (20 to 125 mils) of thermally sprayed metallic powder 31, such as Eutectic 18923 or Sulzer Metco 43C, is sprayed on the core 11d to provide a permeable layer for diverting fluids away from bond line 33 to the elastomer and away from the surface of the core. For further protection, however, a relatively thin layer 32 of wire arc material, such as Sulzer Metco #2 wire in the 5 to 15 mil range, is applied over the metallic powder layer to provide a superior rubber-to-metal bonding.

EXAMPLES

In order to simulate the field conditions that cause rollers to fail by corrosion and water accumulation, a test device was constructed. The standard test roller consisted of a hollow steel tube of about three inches in diameter with a 80 mil wall thickness. Each bond system, rubber compound, or thermal spray layer to be tested was applied to one of these steel tubes. The normal tube length was 10 inches.

After the test roller was covered with (silicone) rubber, cured, and ground to size, it was placed in a steam autoclave at 180° F. The test roller was mounted on a water cooled mandrel which was maintained at approximately 50 to 60° F. with a water flow rate of about one gallon per minute. To accelerate the water condensation at the rubber-to-metal interface, the rubber was only 0.125 inch in wall thickness.

After the test roller was removed from the vulcanizer, the bond strength of the silicone covering to the core was tested, the covering was inspected for the presence of water at the bond interface, and the core was inspected for corrosion.

The quality of the rubber-to-metal bond was determined by the amount of rubber still attached to the core after the cover was stripped off. If the rubber strip peeled clean from the core, the bond has completely failed. If there was a layer of rubber (amount can vary with the bond quality) still attached to the core, the layers of rubber have peeled apart but the bond has not failed.

The standard steel core preparation method provides for either sanding or grit blasting the core surface to about 200 $R_a$ (minimum) followed by application of a suitable silicone to metal bonding agent. With normal core preparation, water accumulated at the rubber to metal bond interface and caused blistering and corrosion within 3 to 5 days. The blisters contained water and were up to 0.5 inch in diameter or larger. The core was corroded and a black sludge, reaction product was also formed on the core surface, the same as observed on production rollers returned from the field. The rubber/metal bond was essentially destroyed and the rubber could be easily peeled like a banana skin. As the rubber was peeled from the core a significant amount of water appeared at the peel point showing that the material was saturated.

Increasing the roughness of the core by grit blasting (up to 500 $R_a$) improved the bond strength slightly, after the condensation test, but did not retard the accumulation of water or the formation of corrosion. Part of the bond failure was due to corrosion of the core.

Thermal spray bond layers, 3 to 20 mils thick, of Sulzer Metco 43C, nickel chrome powder (applied with an oxygen/fuel thermal spray gun), were evaluated as bonding layers. After the condensation test, none of the test rollers was corroded. Water did accumulate at the bond interface and form blisters. The remaining bond strength was significantly better than any of the sanded or grit blasted rollers because of the more complex surface and the lack of corrosion. These layers were not permeable enough to prevent the formation of blisters or the loss of bond strength due to the accumulation of water. The rubber did not strip cleanly away from the core, however. The amount of rubber left on the core was related to the surface roughness of the thermal spray coating. Layers of the 43C material had a surface roughness of about 700 $R_a$ as sprayed.

Thermal spray layers of Eutectic 18923, 3 to 20 mils thick, were evaluated with similar results to the 43C material. The 18923 material layers had a surface roughness of about 400 $R_a$ as sprayed.

Thermal spray layers of Sulzer Metco #2 wire, applied with a Sulzer Metco 6R wire arc gun, were evaluated in the range of 4 to 60 mils thick. The "medium air cap" was used to provide coatings with surface roughness values in the 500 to 2000 $R_a$ range. Rougher and more porous coatings can be produced if the "high profile air cap" is used. Coatings up to 250 mils thick or more can be produced with the #2 wire arc material. Layers less than about 10 mils thick did not produce full coverage of the core surface and were found to be unsuitable for both corrosion protection and rubber bonding.

Test rollers with 15 to 60 mil thick layers of #2 arc wire did not have any core corrosion after the condensation test. On layers that were 30 mils thick or less, blisters formed at the bond interface, although the blisters did not form as quickly because the mechanical bond strength was greatly improved by the high $R_a$ of the bonding surface.

On layers that were 40 mils or thicker, blisters did not form at the bond interface even if the condensation test was extended to nearly two weeks. As the rubber was pulled away from the core there were droplets of water at the bond line (the rubber was saturated) but the rubber-to-metal bond was still excellent. Both of these observations show that condensation was proceeding all the way to the core but that the water was being dissipated. Hydraulic forces were not causing the rubber to separate from the core, or from itself, and blisters were not forming.

It was therefore determined that a continuous layer of thermal spray, corrosion resistant alloy, even if applied by a low velocity process, will prevent corrosion by water condensation at the rubber to metal interface.

It was further concluded that a layer of thermal spray metal or alloy as thin as 3 mils will provide a bonding surface equal or superior to a high profile (500 $R_a$) grit blasted surface.

It was further concluded that a thermal spray layer of corrosion resistant alloy, applied by the wire arc spray process, is permeable enough to prevent water accumulation due to condensation, if the layer is greater than about 35 mils thick and is sprayed with at least the medium porosity spray parameters (medium air cap), producing coatings in the 500 to 2000 $R_a$ range. Rougher, more porous coatings, produced with high profile parameters, up to 250 mils thick or more, would also have a suitable permeation characteristic.

The above has been a description of the detailed, preferred embodiments of the apparatus of the present invention. Various modifications to the details which are described above, which will be apparent to those of ordinary skill in the art, are included within the scope of the invention, as will become apparent from the following claims.

We claim:

1. A roller comprising:
   a roller core;
   a bond coat bonded to the core to provide an outer surface roughness;
   a coat of elastomeric material bonded to the bond coat to form a bond line along which the elastomeric material is bonded to the core;
   wherein said bond coat comprises a thermally sprayed material selected from a group of materials consisting of metals, metal alloys, ceramics and cermets; and
   wherein said bond coat further comprises a thermally sprayed coating of material that is sufficiently permeable for diverting bond-degrading fluids away from the bond line.

2. The roller of claim 1, wherein the wherein the of the bond coat is either a metal wire, a rod, or a powder material.

3. The roller of claim 1, wherein the wherein the bond coat comprises a plurality of coating layers.

4. The roller of claim 1, wherein the core is made of metal.

5. The roller of claim 1, wherein the bond coat has a surface roughness in a range from at least approximately 401 microinches $R_a$ to approximately 2000 microinches $R_a$.

6. A The roller of claim 1, wherein the bond coat further comprises a single layer having a thickness of at least 35 mils.

7. The roller of claim 6, wherein the single layer is comprised of a plurality of coatings of a like material resulting from several passes of thermal spraying.

8. The roller of claim 1, wherein the bond coat further comprises at least two layers, one of the two layers having a greater density and less porosity than another one of the two layers.

9. The roller of claim 8, wherein said one of the two layers has a thickness in a range from about 5 mils to about 15 mils; and
   wherein said other one of the two layers has a thickness from about 20 mils to about 125 mils.

10. The roller of claim 1, wherein the bond coat further comprises a first layer and a second layer which are both permeable, wherein the second layer is coarser than the first layer for the purpose of assisting mechanical bonding to the elastomeric layer; and wherein the second layer has greater permeability than the first layer.

11. The roller of claim 1, wherein the elastomeric material is either silicone rubber or urethane.

12. The roller of claim 1, wherein the core is made of a fiber-reinforced resinous composite material.

13. The roller of claim 1, wherein the bond coat is a 300 series or 400 series stainless steel alloy.

14. The roller of claim 1, wherein the bond coat is a nickel-chromium alloy.

15. The roller of claim 1, wherein the bond coat is a nickel-based alloy.

16. The roller of claim 1, wherein the elastomer is applied by casting, extrusion, or wrapping with calendered rubber sheets.

17. The roller of claim 1, wherein the elastomeric material is based on a natural or synthetic elastomer.

18. The roller of claim 1, wherein chemical bonding agents are used to assist bonding between the thermal spray bond coat and the elastomeric covering material.

19. The roller of claim 1, wherein the thermally sprayed bond layer is applied over an existing thermally sprayed bond layer.

20. A roller comprising:
    a roller core;
    a bond coat bonded to the core to provide an outer surface roughness;
    a coat of elastomeric material bonded to the bond coat to form a bond line along which the elastomeric material is bonded to the core;
    wherein said bond coat comprises a thermally sprayed material selected from a group of materials consisting of metals, metal alloys, ceramics and cermets; and
    wherein said bond coat further comprises a thermally sprayed coating of impermeable material, wherein the bond coat has a thickness of a range 3 mils to 250 mils.

* * * * *